(12) United States Patent
Chiu et al.

(10) Patent No.: US 11,406,926 B2
(45) Date of Patent: Aug. 9, 2022

(54) AIR FILTRATION SYSTEM

(71) Applicants: Tunghai University, Taichung (TW); Chien-Hung Lin, Taipei (TW); Angela Wang, Taichung (TW)

(72) Inventors: Kuo-Wei Chiu, Taichung (TW); Chien-Hung Lin, Taipei (TW); Angela Wang, Taichung (TW)

(73) Assignees: TUNGHAI UNIVERSITY, Taichung (TW); Chien-Hung Lin, Taipei (TW); Angela Wang, Taichung (TW)

( * ) Notice: Subject to any disclaimer, the term of this patent is extended or adjusted under 35 U.S.C. 154(b) by 179 days.

(21) Appl. No.: 16/834,554

(22) Filed: Mar. 30, 2020

(65) Prior Publication Data
US 2021/0245079 A1 Aug. 12, 2021

(30) Foreign Application Priority Data
Feb. 7, 2020 (TW) ................................. 109103843

(51) Int. Cl.
*B01D 46/00* (2022.01)
*B01D 46/42* (2006.01)
*B01D 46/62* (2022.01)

(52) U.S. Cl.
CPC ..... *B01D 46/0017* (2013.01); *B01D 46/0012* (2013.01); *B01D 46/0041* (2013.01); *B01D 46/4245* (2013.01); *B01D 46/62* (2022.01)

(58) Field of Classification Search
CPC ................ B01D 46/0017; B01D 46/62; B01D 46/0012; B01D 46/0041; B01D 46/4245;
(Continued)

(56) References Cited

U.S. PATENT DOCUMENTS

| 5,219,469 A * | 6/1993 | Binzer ................... | B01D 35/10 210/483 |
| 2012/0192718 A1* | 8/2012 | Sukhman ............... | B01D 53/04 95/287 |

FOREIGN PATENT DOCUMENTS

CN 208574346 U * 3/2019

* cited by examiner

*Primary Examiner* — Robert A Hopkins
*Assistant Examiner* — Qianping He
(74) *Attorney, Agent, or Firm* — Guice Patents PLLC

(57) ABSTRACT

An air filtration system includes a main body having a flow path; a first filter portion provided on the flow path and having a first body portion; a plurality of protrusions distributed and disposed on the first body portion; and a plurality of first through holes passing through the first body portion and interposed between the adjacent protrusions; wherein when an external fluid flows in the flow path, the external fluid passes through the protrusions first and then passes through each of the first through holes, so that the flowing external fluid is hindered by the protrusions, and thus a flow velocity at a position adjacent to the protrusions is lower than a flow velocity flowing through the first through holes, thereby vortices are respectively generated between orifices of the first through holes and the adjacent protrusions.

The present invention discloses an air filtration system including: a main body having a flow path; a first filter portion provided on the flow path and having a first body portion; a plurality of protrusions distributed and disposed on the first body portion; and a plurality of first through holes passing through the first body portion and interposed between the adjacent protrusions; wherein when an external fluid flows in the flow path, the external fluid passes through the protrusions first and then passes through each of the first through holes, so that the flowing external fluid is hindered (Continued)

by the protrusions, and thus a flow velocity at a position adjacent to the protrusions is lower than a flow velocity flowing through the first through holes, thereby vortices are respectively generated between orifices of the first through holes and the adjacent protrusions, so that particulates contained in the external fluid stay in static areas outside the vortices.

16 Claims, 4 Drawing Sheets

(58) Field of Classification Search
CPC ........ B01D 39/00; B01D 45/00; B01D 50/00; B01D 45/04; B01D 45/12; B01D 46/48; B01D 45/16; B01D 46/681; B01D 46/02; G01N 1/22; G01N 15/14; A47L 9/16; B04C 11/00; B04C 5/081; B04C 5/181; B04C 5/04; B65D 47/24; B65D 90/56; F16K 1/36; A62B 23/02; F24C 15/20; F04D 17/16
USPC ........................................................ 55/418.1
See application file for complete search history.

AIR FILTRATION SYSTEM

BACKGROUND OF THE INVENTION

Field of Invention

The present invention relates to filtration technology, and more particularly to an air filtration system.

Related Art

According to the term "Planetary Boundaries" first appeared in related reports in 2009, which mainly means that when the impact caused by human activities exceeds the planetary boundaries, it may cause severe damage, and even catastrophe, and influence current or future human society. Furthermore, scientists have generalized nine types of planetary boundaries affected by human activities: 1. climate change, 2. loss of biodiversity, 3. ozone depletion, 4. ocean acidification, 5. changes in biogeochemical cycles, 6. deforestation and changes in land use, 7. freshwater resources, 8. changes in nitrogen and phosphorus cycles, and 9. suspended particulate pollution.

According to this, planetary boundaries are obviously ones of the important indicators of the global environmental problems in recent years. For example, although climate change has not exceeded the dangerous value, the rapid population growth in recent years and the accompanying dramatically increased carbon dioxide emissions cause the climate to change faster and faster, and it is moving towards the irreversible critical margin. Among the problems, excessive carbon dioxides mostly originate from the emissions of factories or automobiles, and the issues are often discussed. In addition, emissions from factories or automobiles also cause another environmental problem, which is the concentration of suspended particulates in the regional atmosphere. For example, PM 2.5, as we know it, refers to particulate pollutants with a particle size less than 2.5 microns ($\mu m$), which are no less harmful to humans than carbon dioxide. In detail, if the particle size of the suspended particulates in the air is less than 2.5 microns, its light weight can stay in the air for a long time, and it is easy to be sucked into the lungs of the human body by breathing, and can directly enter the human body through the trachea, bronchus and alveoli to cause harm to human organs.

The World Health Organization has listed PM 2.5 as a class 1 carcinogen, and nearly 3 million people die from the effects of suspended particulates every year. In Taiwan, residents have developed the habit of outdoor exercise, however, with the increase of PM 2.5, not only does outdoor exercise not make people healthier, but because of the tiny particulates can penetrate into the alveoli and even be absorbed into the blood; asthma, tuberculosis and even heart disease can be caused to seriously endanger human life.

In fact, Taichung City, Taiwan, located on the west coast of the Pacific Ocean, has been increasingly affected by PM 2.5 in recent years, because the Taichung Power Plant is the third largest single PM 2.5 manufacturing source in Taiwan, and the Taichung Industrial Park also emits a large amount of chemical gases, also there are more automobiles and motorbikes in Taichung than in the capital Taipei, all these various factors have caused the air quality in Taichung's urban area to be quite poor. In addition, in the dry winter and spring seasons, because Taichung is affected by the northeast monsoon and is located on its leeward side, the horizontal airflow is weak, and with the effect of urban temperature inversion, it is easy for pollution sources to accumulate in urban areas and it is difficult to disperse, which will seriously affect the health of local residents.

In view of the above, how to filter and screen out fine particulates in an energy-saving manner in a climate situation with poor convection and poor diffusion in the city, to achieve the effect of purifying the air, will be the issue relevant manufacturers or research and development personnel need to work on and make improvement.

SUMMARY OF THE INVENTION

Therefore, a main object of the present invention is to provide an air filtration system that can provide a simple and efficient dust collection device and make good use of local climatic conditions to guide flow direction, collect and filter an external fluid, so that the present invention can achieve the object of purifying the air without the need of additional driving power.

In order to achieve the above-mentioned object, the air filtration system provided by the present invention includes: a main body having a flow path for an external fluid to flow; a first filter portion provided on the flow path and having a first body portion; a plurality of protrusions distributed and disposed on the first body portion at intervals; and a plurality of first through holes respectively passing through the first body portion and correspondingly interposed between the adjacent protrusions; wherein when the external fluid flows in the flow path, the external fluid passes through the protrusions first and then passes through each of the first through holes, so that the flowing external fluid is hindered by the protrusions, and thus a flow velocity at a position adjacent to the protrusions is lower than a flow velocity flowing through the first through holes, thereby vortices are respectively generated between orifices of the first through holes and the adjacent protrusions, so that particulates contained in the external fluid stay in static areas outside the vortices.

In order to further filter the PM2.5 particulates, the present invention further includes a second filter portion disposed on the flow path and located at a downstream side of the first filter portion and having a second body portion; a plurality of cilia extending from the second body portion toward a direction opposite to the flow of the external fluid; and a plurality of second through holes respectively passing through the second body portion; wherein when the external fluid flows in the flow path and flows through the second filter portion, the external fluid passes through the cilia first and then passes through each of the second through holes, so that the flowing external fluid is blocked by the cilia and divided into a plurality of fine flows, and simultaneously the cilia are capable of capturing particulates contained in the external fluid.

Wherein the flow path is provided with a first section, a second section, and a third section sequentially, a cross-sectional area of the first section is greater than a cross-sectional area of the second section, a cross-sectional area of the third section is greater than the cross-sectional area of the second section, and there is a pressure difference between the third section and the second section, so that the external fluid is capable of being drawn to flow into the first section of the flow path, and further flows through the second section towards the direction of the third section of the flow path.

The present invention further includes a conical portion, which is disposed on the first section of the flow path, and partitions the first section of the flow path into a first chamber and a second chamber, an inner diameter of the conical portion is gradually reduced towards an inlet of the flow path, and a plurality of openings are provided at a periphery of the conical portion to communicate the first chamber with the second chamber. Accordingly, when the external fluid flows through the relatively narrow openings, a flow velocity of the external fluid can be increased according to the principle of fluid mechanics.

Wherein the first body portion is tapered and is disposed in the first chamber, an inner diameter of the first body portion gradually decreases toward the direction of the second chamber, and a first sleeve hole is provided at an end of the first body portion to abut against and sleeve on a position of the conical portion away from the openings.

The present invention further includes a cylindrical flow guide portion reducingly protruding into the second chamber from the second section of the main body.

Wherein the second body portion is tapered, disposed in the second chamber and interposed between the flow guide portion and the conical portion, and a second sleeve hole is provided at an end of the second body portion to abut against and sleeve on a position of the flow guide portion protruding into the second chamber.

Wherein a taper angle of the conical portion is greater than 35°, and a taper angle of the flow guide portion is greater than 30°.

Wherein a ratio of maximum inner diameters of the first section, the second section, and the third section is 11:5:8, and a ratio of a maximum inner diameter of the first section, a diameter of the opening, a minimum distance between an outer periphery of the flow guide portion and an inner periphery the conical portion, and a minimum inner diameter of the flow guide portion is 11:1.5:1:1.8.

In order to improve the convection effect, the present invention further includes a power source provided on the flow path. The power source has a heat radiation fan, upper and lower sides of each fan blade of the heat radiation fan are respectively composed of different materials, and a fan surface of each of the fan blades is further provided with a triangular protrusion.

BRIEF DESCRIPTION OF THE DRAWINGS

Preferred embodiments of the present invention listed below will be described hereunder in conjunction with the drawings.

DETAILED DESCRIPTION OF THE INVENTION

Figure 1:
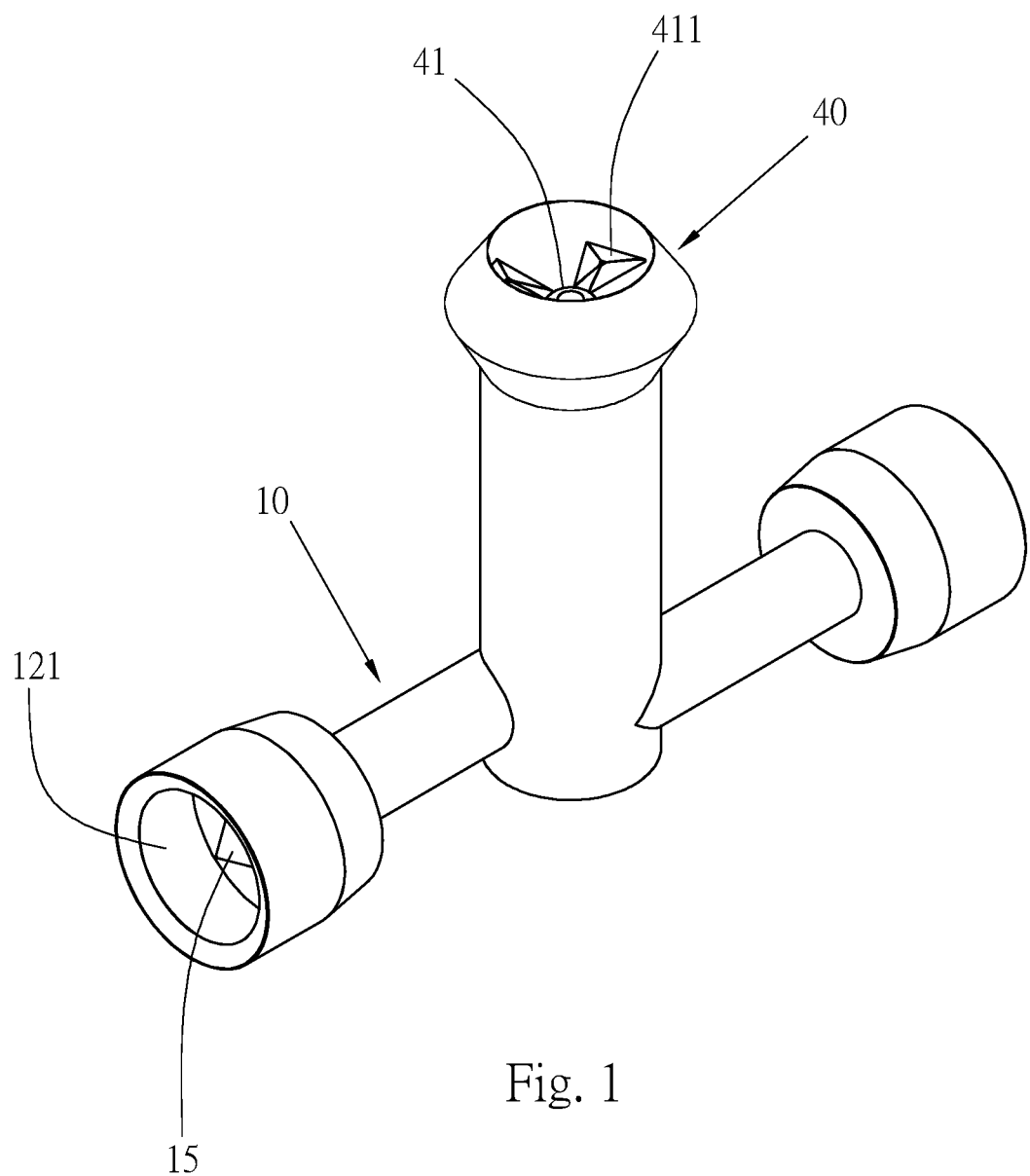
FIG. 1 is a perspective assembled view of an air filtration system according to a preferred embodiment of the present invention.
Figure 2:
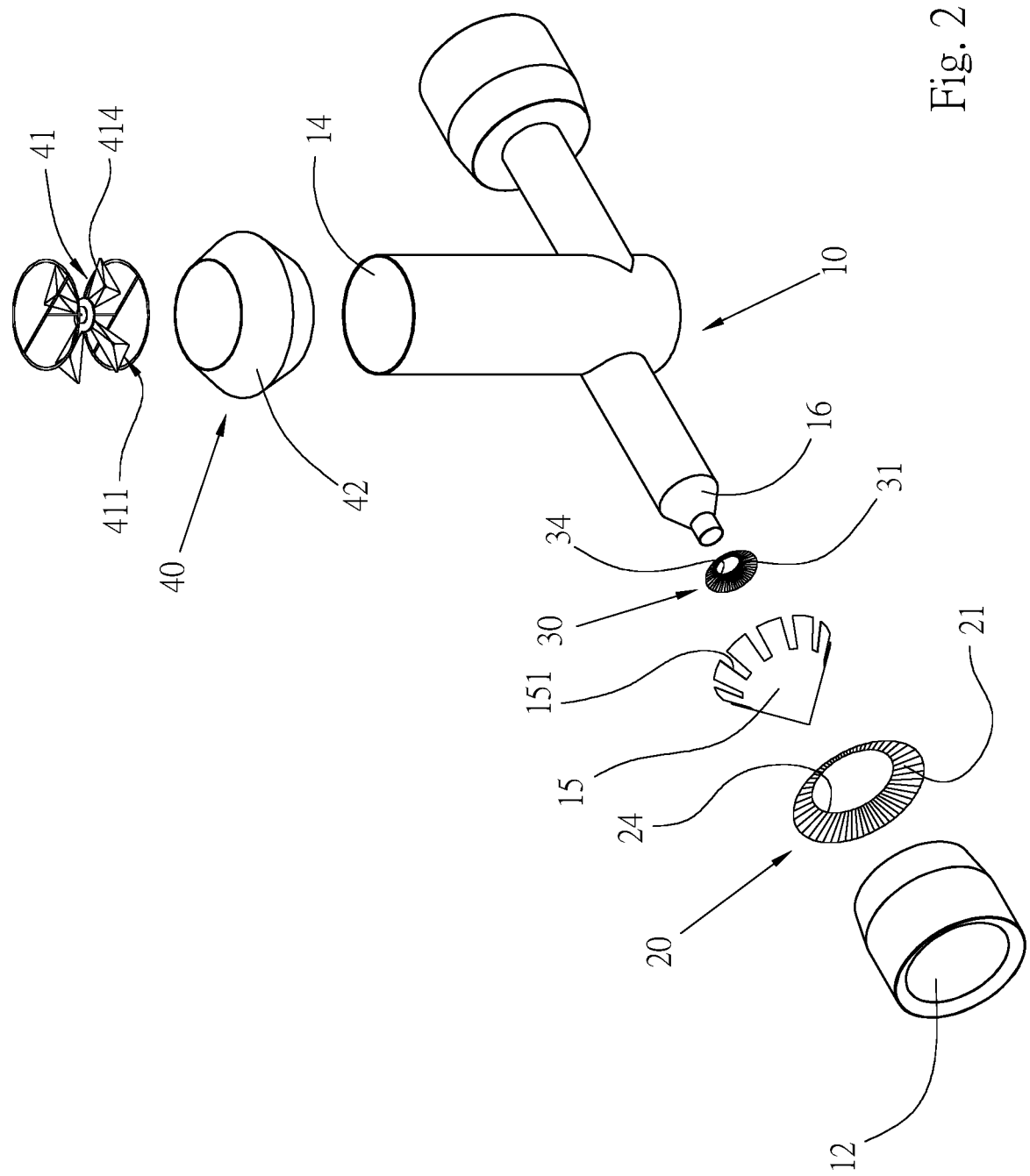
FIG. 2 is an exploded perspective view of the air filtration system according to a preferred embodiment of the present invention.
Figure 3:
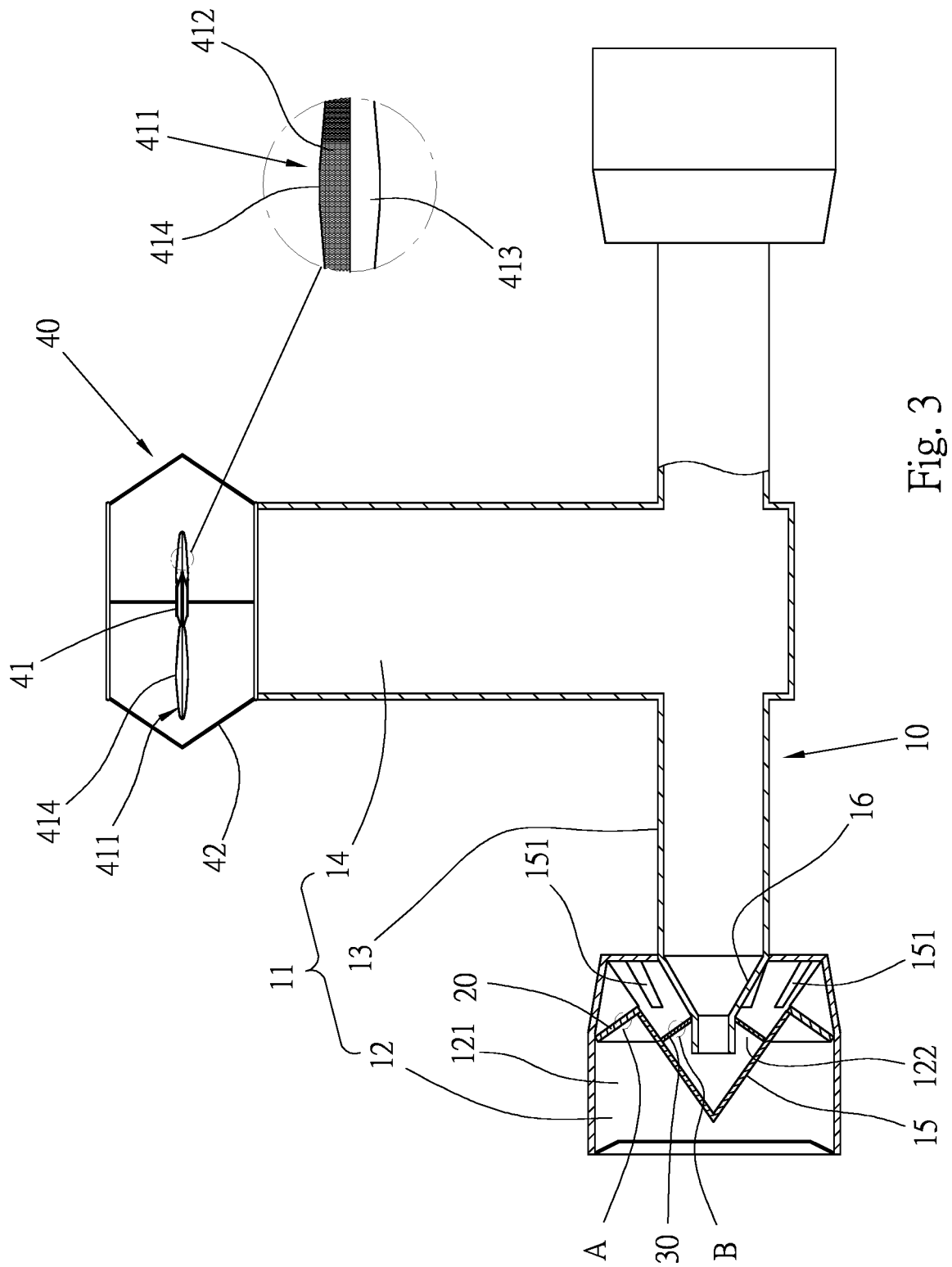
FIG. 3 is a cross-sectional view of FIG. 1 according to a preferred embodiment of the present invention.

Please refer to FIG. 1 to FIG. 3, an air filtration system disclosed in a preferred embodiment of the present invention includes a main body 10 and a first filter portion 20.

The main body 10 has a flow path 11 for an external fluid to flow. Wherein the flow path 11 is provided with a first section 12, a second section 13, and a third section 14 sequentially, a cross-sectional area of the first section 12 is greater than a cross-sectional area of the second section 13, a cross-sectional area of the third section 14 is greater than the cross-sectional area of the second section 13, and there is a pressure difference between the third section 14 and the second section 13, so that the external fluid is capable of being drawn to flow into the first section 12 of the flow path 11, and further flows through the second section 13 toward the direction of the third section 14 of the flow path 11. In this embodiment, the main body 10 is formed by connecting three sets of pipes with different diameters with each other, and internal spaces of the pipes communicate with each other to form the flow path 11. In addition, the shape of an opening 151 of an inlet of the flow path 11 is designed based on the opening structure of doliolum for ingesting microorganisms, so that the external fluid entering the flow path 11 does not flow backward.

Furthermore, a conical portion 15 is further provided on the first section 12 of the flow path 11 to partition the first section 12 of the flow path 11 into a first chamber 121 and a second chamber 122. In addition, an inner diameter of the conical portion 15 is gradually reduced toward the inlet of the flow path 11, and a plurality of the openings 151 are further provided at a periphery of the conical portion 15 to communicate the first chamber 121 with the second chamber 122. In addition, the present invention further includes a cylindrical flow guide portion 16 reducingly protruding into the second chamber 122 from the second section 13 of the main body 10.

Figure 4:
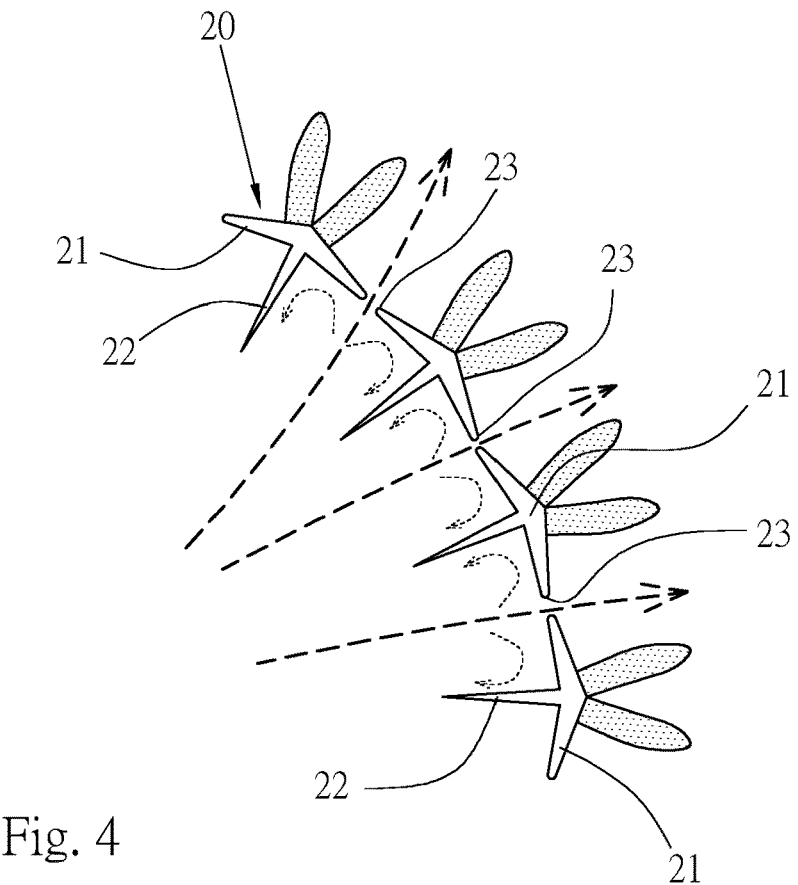
FIG. 4 is a partially enlarged view of part A of FIG. 3 according to a preferred embodiment of the present invention.

The first filter portion 20 is provided on the flow path 11 and has a first body portion 21; a plurality of protrusions 22 distributed and disposed on the first body portion 21 at intervals; a plurality of first through holes 23 respectively passing through the first body portion 21 and correspondingly interposed between the adjacent protrusions 22; wherein when the external fluid flows in the flow path 11, the external fluid passes through the protrusions 22 first and then passes through each of the first through holes 23, so that the flowing external fluid is hindered by the protrusions 22, and thus a flow velocity at a position adjacent to the protrusions 22 is lower than a flow velocity flowing through the first through holes 23, thereby vortices are respectively generated between orifices of the first through holes 23 and the adjacent protrusions 22, so that particulates contained in the external fluid stay in static areas outside the vortices, as shown in FIG. 4. Accordingly, the first filter portion 20 of the present invention is capable of effectively collecting particulates with a particle size larger than 10 microns in the static areas, thereby achieving the effect of filtering and collecting dust. In particular, the structural design of the first filter portion 20 is derived from the foraging method of paddlefish (*Psephurus gladius*) of streaming seawater into the oral cavity and generating vortex through the structural form of the fish gill skeleton, thereby collecting and swallowing plankton and then discharging the seawater.

In this embodiment, the first body portion 21 is tapered and is disposed in the first chamber 121, an inner diameter of the first body portion 21 is gradually reduced toward the direction of the second chamber 122, and a first sleeve hole 24 is provided at an end of the first body portion 21 to abut against and sleeve on a position of the conical portion 15 away from the openings 151.

Figure 5:
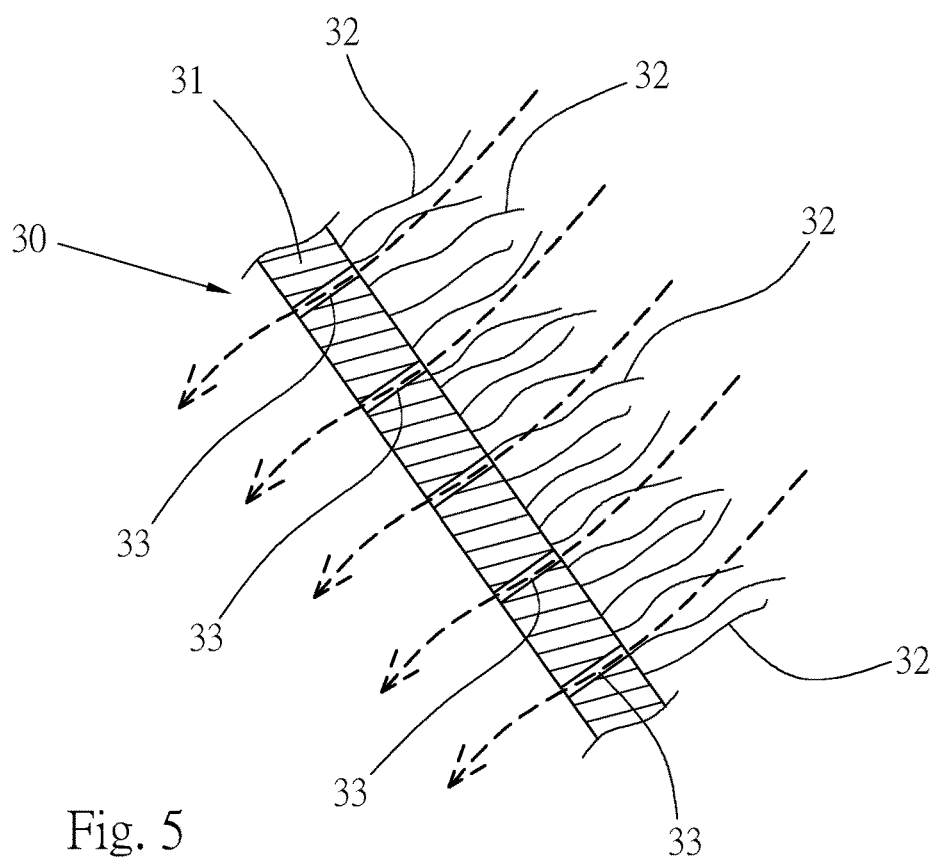
FIG. 5 is a partially enlarged view of part B of FIG. 3 according to a preferred embodiment of the present invention.

In addition, in order to further filter the PM2.5 particulates, the present invention further includes a second filter portion 30 disposed on the flow path 11 and located at a downstream side of the first filter portion 20 and having a second body portion 31; a plurality of cilia 32 extending from the second body portion 31 toward a direction opposite to the flow of the external fluid; and a plurality of second through holes 33 respectively passing through the second body portion 31; wherein when the external fluid flows in the flow path 11 and flows through the second filter portion 30, the external fluid passes through the cilia 32 first and then passes through each of the second through holes 33, so that the flowing external fluid is blocked by the cilia 32 and divided into a plurality of fine flows, and simultaneously the cilia 32 are capable of capturing particulates contained in the external fluid, as shown in FIG. 5. In particular, the structural design of the second filter portion 30 is derived from the foraging method of peacock worm (*Sabella pavonina*) of filtering food in the water by using the filaments extending on its radial antenna.

In this embodiment, the second body portion 31 is tapered, disposed in the second chamber 122 and interposed between the flow guide portion 16 and the conical portion 15, and a second sleeve hole 34 is provided at an end of the second body portion 31 to abut against and sleeve on a position of the flow guide portion 16 protruding into the second chamber 122.

After experiments, it was found that the filtration efficiency of vortex generated by air ducts in the same direction is better. In detail, the external fluid uses air, and air is a medium with a small density and light mass. When the size differences between the inner diameters of the pipes are too large, or the flow direction is changed, it is very easy for the air to generate strong vortex to cause particulates in the air to be excessively accumulated in some corners, which reduces the efficiency of filtering. Accordingly, in order to improve the filtration efficiency, the specific implementation conditions of the present invention are as follows: a ratio of maximum inner diameters of the first section 12, the second section 13, and the third section 14 is 11:5:8, and a ratio of a maximum inner diameter of the first section 12, a diameter of the opening 151, a minimum distance between the flow guide portion 16 and the conical portion 15, and a minimum inner diameter of the flow guide portion 16 is 11:1.5:1:1.8. The proportional relationship is derived from the cave structure of prairie dog, wherein a taper angle of the conical portion 15 is greater than 35°, and a taper angle of the flow guide portion 16 is greater than 30°.

Furthermore, when a user wants to increase the flow rate of the external fluid filtered by the present invention, in addition to being able to arbitrarily assemble a plurality of sets of the air filtration systems for usage, a power source 40 can be additionally installed to enhance the flow rate of the external fluid which can also increase the filtering flow. Specifically, the power source 40 is disposed on the flow path 11 and has a heat radiation fan 41 to provide a larger pressure difference, thereby increasing the filtering efficiency. In particular, the manner in which the heat radiation fan 41 operates is driven by receiving energy from sunlight. In detail, using the principle of heat dissipation of the lines on the zebra body, different colors are coated on various parts of the main body 10; due to the different endothermic effects between the various colors, temperature differences are generated, and according to the cooling vortex theory, different vortex speeds are generated to drive the heat radiation fan 41 to rotate, thereby achieving the object of improving the convection effect.

In this embodiment, upper and lower sides 412, 413 of each fan blade 411 of the heat radiation fan 41 are respectively composed of different materials, wherein the upper side 412 is dark to absorb radiant heat, and the lower side 413 is silver to reflect radiant heat. Moreover, a fan surface of each of the fan blades 411 is further provided with a triangular protrusion 414. The structural design of the protrusion 414 is inspired by the hair of Saharan silver ant (*Cataglyphis bombycina*), the hair is triangular and jagged, and the amount of light reflected by the hair with this particular shape can reduce heat absorption. On the other hand, the power source 40 further has a total reflection prism 42, which is covered above the heat radiation fan 41, and uses the process of total internal reflection (TIR) to converge the heating source. The temperature difference effect caused by the above conditions is used to actuate the heat radiation fan 41 to rotate.

With the composition of the above components, the specific implementation steps of the air filtration system of the present invention are as follows: first, a pressure difference is formed in the flow path 11 through the differences in the diameters of each of the pipes, and the external fluid is drawn to flow into the first chamber 121 of the first section 12. Furthermore, the external fluid flows along an outer periphery of the conical portion 15 toward the direction of the second chamber 122, and flows through the first filter portion 20 while using the filtering mechanism of the first filter portion 20. This means that the particulates contained in the external fluid stay in the static area outside the vortices, so that the particulates in the external fluid can be preliminarily filtered, that is, the external fluid flowing into the second chamber 122 has been preliminarily filtered.

Then, the external fluid passes through the openings 151 opened on the conical portion 15, and at this time, since apertures of the openings 151 are relatively narrow, according to the principle of fluid mechanics, the flow velocity of the external fluid can be increased and the external fluid can smoothly flow in a passage formed between an outer periphery of the flow guide portion 16 and an inner periphery the conical portion 15. Then, the external fluid flows through the second filter portion 30, and through the cilia 32 of the second filter portion 30, more fine flows can be generated downstream, and smaller particulates can be captured to obtain the purified external fluid.

Finally, since the structural design of the flow guide portion 16 is similar to the central chamber of spongia and its special wall structure, a pressure difference can be further provided, so that the purified external fluid can be quickly guided from the second chamber 122 into the second section 13 of the flow path 11, and further flows through the third section 14 of the flow path 11, and finally flows out from an outlet of the flow path 11.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An air filtration system comprising:
   a main body having a flow path for an external fluid to flow;
   a first filter portion provided on the flow path and having a first body portion; a plurality of protrusions distributed and disposed on the first body portion at intervals;

and a plurality of first through holes respectively passing through the first body portion and correspondingly interposed between the adjacent protrusions; wherein when the external fluid flows in the flow path, the external fluid passes through the protrusions first and then passes through each of the first through holes, so that the flowing external fluid is hindered by the protrusions, and thus a flow velocity at a position adjacent to the protrusions is lower than a flow velocity flowing through the first through holes, thereby vortices are respectively generated between orifices of the first through holes and the adjacent protrusions, so that particulates contained in the external fluid stay in static areas outside the vortices; and a second filter portion disposed on the flow path and located at a downstream side of the first filter portion and having a second body portion; a plurality of cilia extending from the second body portion toward a direction opposite to the flow of the external fluid; and a plurality of second through holes respectively passing through the second body portion; wherein when the external fluid flows in the flow path and flows through the second filter portion, the external fluid passes through the cilia first and then passes through each of the second through holes, so that the flowing external fluid is blocked by the cilia and divided into a plurality of fine flows, and simultaneously the cilia are capable of capturing particulates contained in the external fluid;

wherein the flow path is provided with a first section, a second section, and a third section sequentially, a cross-sectional area of the first section is greater than a cross-sectional area of the second section, a cross-sectional area of the third section is greater than the cross-sectional area of the second section, and there is a pressure difference between the third section and the second section, so that the external fluid is capable of being drawn to flow into the first section of the flow path, and further flows through the second section of the flow path towards the direction of the third section of the flow path.

2. The air filtration system as claimed in claim 1, further including a conical portion disposed on the first section of the flow path, and partitioning the first section of the flow path into a first chamber and a second chamber, an inner diameter of the conical portion being gradually reduced toward an inlet of the flow path, and a plurality of openings being provided at a periphery of the conical portion to communicate the first chamber with the second chamber.

3. The air filtration system as claimed in claim 2, wherein the first body portion is tapered and is disposed in the first chamber, an inner diameter of the first body portion gradually decreases toward the direction of the second chamber, and a first sleeve hole is provided at an end of the first body portion to abut against and sleeve on a position of the conical portion away from the openings.

4. The air filtration system as claimed in claim 3, further including a cylindrical flow guide portion reducingly protruding into the second chamber from the second section of the main body.

5. The air filtration system as claimed in claim 4, wherein the second body portion is tapered, disposed in the second chamber and interposed between the cylindrical flow guide portion and the conical portion, and a second sleeve hole is provided at an end of the second body portion to abut against and sleeve on a position of the cylindrical flow guide portion protruding into the second chamber.

6. The air filtration system as claimed in claim 4, wherein a taper angle of the conical portion is greater than 35°, and a taper angle of the cylindrical flow guide portion is greater than 30°.

7. The air filtration system as claimed in claim 4, wherein a ratio of maximum inner diameters of the first section, the second section, and the third section is 11:5:8, and a ratio of a maximum inner diameter of the first section, a diameter of the opening, a minimum distance between an outer periphery of the cylindrical flow guide portion and an inner periphery the conical portion, and a minimum inner diameter of the cylindrical flow guide portion is 11:1.5:1:1.8.

8. The air filtration system as claimed in claim 1, further including a power source provided on the flow path, the power source having a heat radiation fan, upper and lower sides of each fan blade of the heat radiation fan being respectively composed of different materials, and a fan surface of each of the fan blades being further provided with a triangular protrusion.

9. The air filtration system as claimed in claim 2, further including a power source provided on the flow path, the power source having a heat radiation fan, upper and lower sides of each fan blade of the heat radiation fan being respectively composed of different materials, and a fan surface of each of the fan blades being further provided with a triangular protrusion.

10. The air filtration system as claimed in claim 3, further including a power source provided on the flow path, the power source having a heat radiation fan, upper and lower sides of each fan blade of the heat radiation fan being respectively composed of different materials, and a fan surface of each of the fan blades being further provided with a triangular protrusion.

11. The air filtration system as claimed in claim 4, further including a power source provided on the flow path, the power source having a heat radiation fan, upper and lower sides of each fan blade of the heat radiation fan being respectively composed of different materials, and a fan surface of each of the fan blades being further provided with a triangular protrusion.

12. The air filtration system as claimed in claim 5, further including a power source provided on the flow path, the power source having a heat radiation fan, upper and lower sides of each fan blade of the heat radiation fan being respectively composed of different materials, and a fan surface of each of the fan blades being further provided with a triangular protrusion.

13. The air filtration system as claimed in claim 6, further including a power source provided on the flow path, the power source having a heat radiation fan, upper and lower sides of each fan blade of the heat radiation fan being respectively composed of different materials, and a fan surface of each of the fan blades being further provided with a triangular protrusion.

14. The air filtration system as claimed in claim 7, further including a power source provided on the flow path, the power source having a heat radiation fan, upper and lower sides of each fan blade of the heat radiation fan being respectively composed of different materials, and a fan surface of each of the fan blades being further provided with a triangular protrusion.

15. An air filtration system comprising:
a main body having a flow path for an external fluid to flow; and
a first filter portion provided on the flow path and having a first body portion; a plurality of protrusions distributed and disposed on the first body portion at intervals;

and a plurality of first through holes respectively passing through the first body portion and correspondingly interposed between the adjacent protrusions; wherein when the external fluid flows in the flow path, the external fluid passes through the protrusions first and then passes through each of the first through holes, so that the flowing external fluid is hindered by the protrusions, and thus a flow velocity at a position adjacent to the protrusions is lower than a flow velocity flowing through the first through holes, thereby vortices are respectively generated between orifices of the first through holes and the adjacent protrusions, so that particulates contained in the external fluid stay in static areas outside the vortices; and a power source provided on the flow path, the power source having a heat radiation fan, upper and lower sides of each fan blade of the heat radiation fan being respectively composed of different materials, and a fan surface of each of the fan blades being further provided with a triangular protrusion.

16. An air filtration system comprising:

a main body having a flow path for an external fluid to flow;

a first filter portion provided on the flow path and having a first body portion; a plurality of protrusions distributed and disposed on the first body portion at intervals; and a plurality of first through holes respectively passing through the first body portion and correspondingly interposed between the adjacent protrusions; wherein when the external fluid flows in the flow path, the external fluid passes through the protrusions first and then passes through each of the first through holes, so that the flowing external fluid is hindered by the protrusions, and thus a flow velocity at a position adjacent to the protrusions is lower than a flow velocity flowing through the first through holes, thereby vortices are respectively generated between orifices of the first through holes and the adjacent protrusions, so that particulates contained in the external fluid stay in static areas outside the vortices;

a second filter portion disposed on the flow path and located at a downstream side of the first filter portion and having a second body portion; a plurality of cilia extending from the second body portion toward a direction opposite to the flow of the external fluid; and a plurality of second through holes respectively passing through the second body portion; wherein when the external fluid flows in the flow path and flows through the second filter portion, the external fluid passes through the cilia first and then passes through each of the second through holes, so that the flowing external fluid is blocked by the cilia and divided into a plurality of fine flows, and simultaneously the cilia are capable of capturing particulates contained in the external fluid; and a power source provided on the flow path, the power source having a heat radiation fan, upper and lower sides of each fan blade of the heat radiation fan being respectively composed of different materials, and a fan surface of each of the fan blades being further provided with a triangular protrusion.

* * * * *